(12) United States Patent
Wang et al.

(10) Patent No.: US 6,409,395 B1
(45) Date of Patent: Jun. 25, 2002

(54) METHOD FOR FABRICATING FIBER ARRAYS WITH PRECISION FIBER CORE-TO-CORE PITCH AND HEIGHT

(75) Inventors: Xiaomei Wang, Winchester; Dale C. Flanders, Lexington, both of MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/864,501

(22) Filed: May 24, 2001

(51) Int. Cl.[7] .................................................. G02B 6/36
(52) U.S. Cl. ........................................................ 385/83
(58) Field of Search ................................. 385/104, 111, 385/109, 83

(56) References Cited

U.S. PATENT DOCUMENTS

| | | | |
|---|---|---|---|
| 4,904,052 A | * 2/1990 | Rand et al. | 385/128 |
| 5,073,002 A | * 12/1991 | Hockaday | 385/49 |
| 5,173,959 A | * 12/1992 | Cambriello | 385/89 |
| 5,689,599 A | * 11/1997 | Shahid | 385/83 |

FOREIGN PATENT DOCUMENTS

| | | | |
|---|---|---|---|
| EP | 1033595 | 6/2000 | G02B/6/38 |
| WO | WO00/65396 | 11/2000 | G02B/6/42 |

OTHER PUBLICATIONS

Multiple Fiber Interconnect Using Silicon V–Grooves, P.C. Chang, S. Sriram, A.C. Wey, SPIE vol. 836 Optoelectronic Materials, Devices, Packaging, and Interconnects, '1987, pp. 311–317.

Optical Fiber V–groove Transversal Filter, S.A. Newton, K.P. Jackson, and H.J. Shaw, 1983 American Institute of Physics, p. 149.

Self–Alignment Technique for Fiber Attachment to Guided Wave Devices, Edmond J. Murphy and Trudie C. Rice, IEEE Journal of Quantum Electronices, vol. QE–22, No. 6, Jun. 1986, pp. 928–932.

* cited by examiner

Primary Examiner—Tulsidas Patel
(74) Attorney, Agent, or Firm—Mills & Onello, LLP

(57) ABSTRACT

A fiber array apparatus and formation method mitigates or eliminates height offset and/or angular offset of the respective fiber cores in the array. In one aspect, the fibers are mounted in the array such that the respective core-to-clad offset axes of the fibers, defined between the fiber core center and the cladding center of each fiber, are substantially parallel. In another aspect, the plurality of fibers are cut from the same fiber spool, ensuring consistency in cladding outer diameter. In this manner, precision in core-to-core pitch and consistency in core-to-core height are achieved in the fiber array.

28 Claims, 4 Drawing Sheets

METHOD FOR FABRICATING FIBER ARRAYS WITH PRECISION FIBER CORE-TO-CORE PITCH AND HEIGHT

BACKGROUND OF THE INVENTION

In contemporary optical-electronic hybrid systems, an optical fiber interfaces with an opto-electronic device. The opto-electronic device typically includes a hermetic package, having a plurality of conductive leads for electronic communication with devices external to the package.

During manufacture, single or multiple fiber optic pigtails are inserted through ferrules provided in side walls of the package. The end face of each pigtail is typically positioned and bonded to a bench or submount installed within the package. The body of each pigtail is bonded to a corresponding ferrule to facilitate the hermetic seal of the package.

As opto-electronic technology continues to evolve, there is a continuous drive toward higher integration. This generally requires an increased number of fiber pigtails to extend across the package perimeter, as well as an increased need for heightened precision in aligning the fiber endfaces with internal opto-electronic components.

A standard fiber optic cross section is illustrated in FIG. 1. A fiber core 12 is encased in cladding 14. The fiber core may for example be comprised of silica, while the cladding may be comprised of silica having a lower index of refraction than that of the core 12. The cladding 14 is encased in a coating 16 which is, in turn, surrounded by a protective jacket 18. The coating and protective jacket may, for example, be formed of any of a number of polymers. In a popular configuration, the diameters of the core 12, cladding 14, coating 16, and protective jacket 18 layers are 9 $\mu$m, 125 $\mu$m, 250 $\mu$m, and 900–3000 $\mu$m, respectively.

Despite precision processing during manufacture of optical fibers, a number of variations in the finished fiber can occur. These include variation in the cladding 14 diameter, and variation in the center position of the core 12 relative to the center of the cladding 14, i.e., core-cladding eccentricity.

With reference to the end view of FIG. 2, in order to manage fiber congestion in a device, the fibers are commonly arranged into an array on a silicon bench. The bench 22 includes an upper bench portion 22A and a lower bench portion 22B. A number of opposed V-grooves 28A, 28B are formed in the upper and lower bench portions 22A, 22B. The V-grooves are formed in parallel with respect to each other, and at precise intervals which, for example, may be periodic.

The outer protective jacket 18 and coating 16 are stripped from the fiber ends, and the ends are positioned and bonded between the V-grooves 28A, 28B. When the fibers are bonded, the aforementioned variations can result in misalignment of the fiber cores with the intended interface, for example the optical components that are installed in the submount. With reference to the example provided in FIG. 2, the respective cladding diameters of fibers 20A, 20B, and 20C are consistent, and therefore their respective fiber center positions 24A, 24B, 24C are properly centered with respect to the upper and lower V-grooves 28A, 28B. However, the cladding diameters of fibers 20D and 20E are smaller than those of fibers 20A, 20B, and 20C, and therefore their respective fiber center positions 24D, 24E are not centered between the upper and lower V-grooves 28A, 28B. This variation in cladding outer diameter causes a height offset between the respective fibers in the array.

Ideally, the fiber core 26D is located directly at the fiber center position 24D, as shown in fiber 20D. However, due to manufacturing imprecision, the fiber core 26A, 26B, 26C, 26E can vary in radial distance from the fiber center position 24A, 24B, 24C, 24E as shown in fibers 20A, 20B, 20C, and 20E, i.e., core eccentricity. As a result, the position and angular orientation of the fiber core 26 can vary with respect to the center position of the upper and lower V-grooves 28A, 28B, as shown. Such a variance can also cause a height offset, as well as angular offset, between beams emitted from the respective fibers, or the input apertures that define where a beam must be focused to be coupled into, and be propagated by, the fiber.

SUMMARY OF THE INVENTION

The present invention is directed to an apparatus and method that addresses the limitations of conventional approaches described above. Particularly, the present invention provides an apparatus and method by which height offset and/or angular core offset of optical fibers that are mounted in an array are mitigated. In this manner, a level of precision is achieved that is advantageous for application in opto-electronic systems.

The fibers are preferably mounted in the array such that the respective core-to-clad offset axes of the fibers, defined between the fiber core center and the cladding center of each fiber, are at substantially the same angle with respect to the lateral axis of the bench The fiber pigtails are preferably cut from the same fiber spool, ensuring consistency in cladding outer diameter. In this manner, precision in core-to-core pitch and consistency in core-to-core height are achieved in the fiber array.

In one aspect, the present invention is directed to a fiber array. The array includes a bench and fiber pigtails. The bench includes seats for receiving the fiber pigtails. The fibers are mounted in the seats; the fibers include a fiber core and cladding surrounding the fiber core. Each fiber has a core-to-clad offset axis defined between the fiber core center and the cladding center of each fiber. This is a measure of the core eccentricity. The fibers are mounted in the array such that the respective core-to-clad offset axes of the fibers are at substantially the same angle with respect to each other.

In another aspect, the present invention is directed to a fiber array including a bench and fiber pigtails. The bench includes a plurality of parallel seats for receiving the fibers. Fibers are mounted in the seats. The fibers comprise a fiber core and cladding surrounding the fiber core, and are cut from a common fiber spool. The angle between the core-to-clad offset axes and a plane of the submount may be 90 degrees, 0 degrees, or an acute angle.

In preferred embodiments, the seats comprise V-grooves, and the bench comprises silicon. The bench includes an upper portion and a lower portion; the upper and lower portions each include opposed seats for housing inserted fibers. Alternatively, the bench includes an upper portion and a lower portion, wherein the lower portion includes the seats and wherein the upper portion comprises a plate.

In another aspect, the present invention is directed to a method of forming a fiber array. A bench is provided, the bench including a plurality of parallel seats for receiving a plurality of fibers. Fibers are mounted in the seats, the fibers comprising a fiber core and cladding surrounding the fiber core, each fiber having a core-to-clad offset axis defined between the fiber core center and the cladding center of each fiber. The fibers are mounted in the array such that the respective core-to-clad offset axes of the fibers are substantially parallel to each other.

In yet another aspect, the present invention is directed to a method of forming a fiber array. A bench is provided, the bench including a plurality of parallel seats for receiving a plurality of fibers. A plurality of fibers are mounted in the seats, the fibers comprising a fiber core and cladding surrounding the fiber core, the fibers being cut from a common fiber spool.

In another aspect, the present invention is directed to a method for aligning fibers in a fiber array with an optical component on a substrate. Fibers are mounted and rotationally oriented in a fiber bench in response to a direction of core-to-cladding offset axes of the fibers. The fiber bench is in turn mounted to a substrate in alignment with a component mounted to the substrate, such that the fibers are aligned with the component.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The present invention is directed to a method for mounting fibers in an array such that the respective positions of the mounted fiber cores are substantially consistent in height and/or core-to-core pitch. The invention is further directed to a fiber array exhibiting such advantageous characteristics. In this manner the fiber array provides a heightened degree of accuracy for aligning the respective fibers with optical components in the package, such as passive; active, and/or opto-electronic components.

Figure 3:
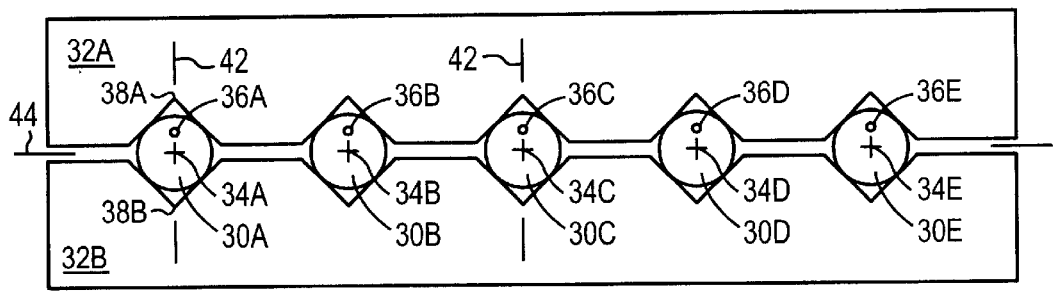
FIG. 3 is a sectional end view of a fiber array in accordance with the present invention, illustrating consistency in fiber core height and angular orientation, in accordance with the present invention.

With reference to FIG. 3, a sectional end view of a fiber array is illustrated in accordance with the present invention. The bench includes upper and lower bench portions 32A, 32B, each including a plurality of spaced-apart V-grooves 38A, 38B. The V-grooves 38A, 38B of the respective upper and lower bench portions 32A, 32B are configured to be opposed such that in combination they provide a precisely aligned seat for inserted fiber pigtails 30A–E. Accordingly, each pair of upper and lower V-grooves 38A, 38B has a corresponding center location in alignment with the respective centers 34A–E of longitudinal axes of the fiber cores.

Figure 1:
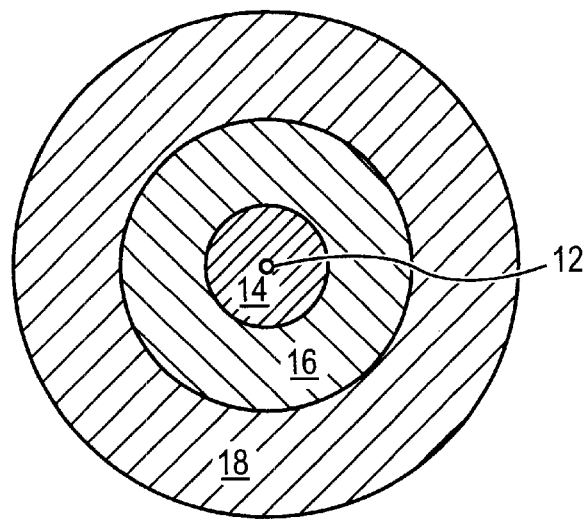
FIG. 1 is a sectional view of a standard fiber optic.
Figure 2:
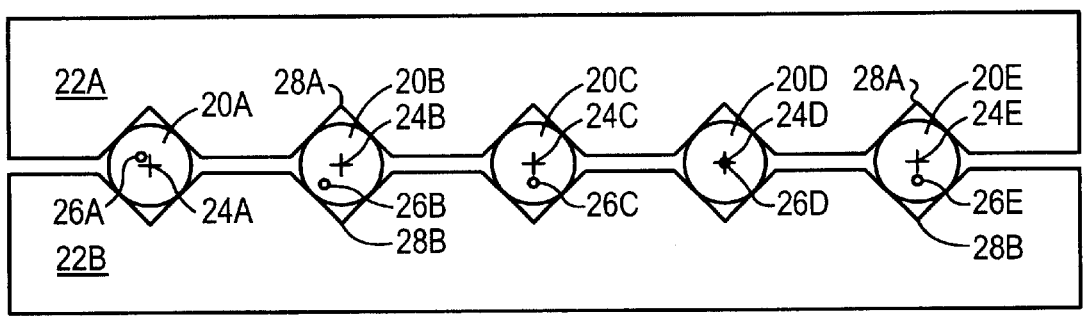
FIG. 2 is a sectional end view of a prior art fiber array, illustrating variation in fiber core height and angular orientation between respective fibers in the array.
Figure 4:
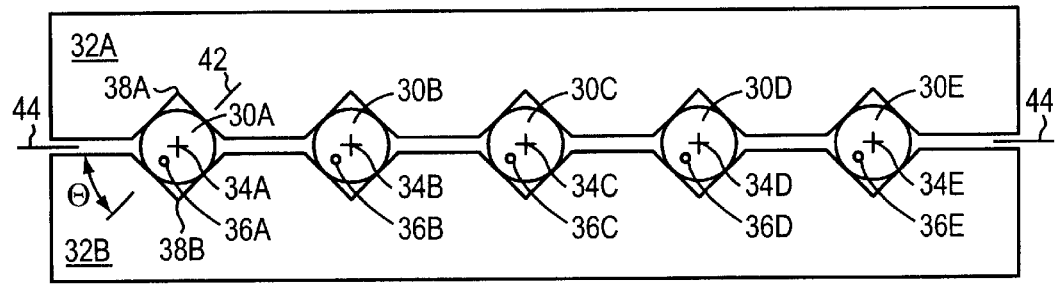
FIG. 4 is a sectional end view of a fiber array in accordance with the present invention, illustrating a different, but consistent, fiber core height and angular orientation, with respect to the example given in FIG. 3, in accordance with the present invention.

As explained above with reference to FIG. 2, any variation in the outer cladding diameter of the fibers 30A–30E can result in height offset in the position of the respective fiber cores 36A–36E. The adverse consequences of cladding diameter variation can be minimized by selecting fibers for the array from the same source spool, as fiber from the same spool tends to have a consistent cladding diameter throughout its length. In this manner, height offset in the core centers due to cladding variation between the respective fibers is mitigated. As shown in FIGS. 3 and 4, the center axes 34A–34E of the fibers are consistently aligned with the center positions of the opposed V-grooves 38A, 38B.

Any remaining error due to fiber core eccentricity is eliminated by rotating each fiber so that the respective cores 36A–36E have the same angular orientation. In the example of FIG. 3, the fiber cores 36A–36E are aligned such that core-to-clad offset axes 42, which are imaginary lines in a plane that is perpendicular to the fibers' longitudinal axes and that passes through the core center 36A and the cladding center 34A, are also perpendicular with respect to the lateral axis 44 of the array. In this manner, precision core-to-core pitch is achieved, since the cores 36A–36E and core-to-clad offset axes 42 are in alignment with the precisely etched V-grooves 38A, 38B. Assuming a substantially similar cladding diameter, consistency in core-to-core height is likewise achieved, as described above.

FIG. 4 illustrates a fiber array configuration wherein the core axes 42, defined above, lie at an acute angle with respect to the lateral axis 44 of the array. This configuration also provides precise core-to-core pitch, as well as consistent core-to-core height.

In the above examples, the orientation of a fiber can be monitored using a back-coupled signal level or image-based metrology method. In either case, a micropostioner can be employed to position the fiber before a sensor that determines the angular orientation of the core-to-clad offset axis prior to mounting the fiber to the bench. A signal is transmitted through the fiber and the sensor determines the position of the core, for example based on the spatial intensity of the transmitted light. Following a determination of core position, the micropositioner is then used to rotate the fiber prior to mounting to the bench in such a manner so as to ensure consistent core-to-core pitch and height between the fibers in the array.

Figure 5:
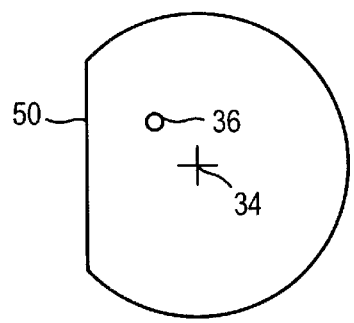
FIG. 5 is a cross-sectional view of a fiber, illustrating a flat formed along the length of the fiber, used for fiber alignment purposes, in accordance with the present invention.

In an alternative embodiment, the spool of fiber is manufactured with a registration feature, such as a flat 50 in FIG. 5. The spool of fiber is then cut into the fiber pigtails. Each pigtail is then installed in the bench with the respective flats at the same angular orientation relative to each other. This embodiment is based on the assumption that core concentricity is relatively invariant along the length of the fiber in the spool or at least of distances corresponding to the combined lengths of the pigtails.

Figure 6:
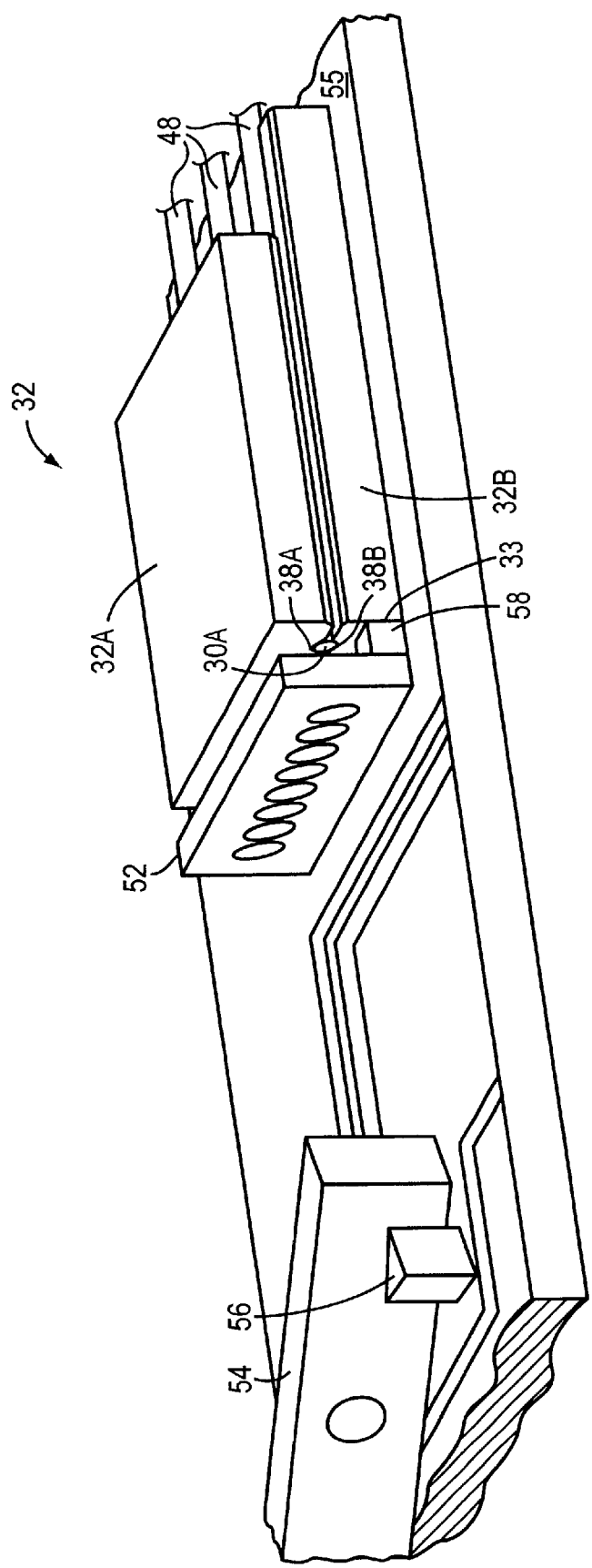
FIG. 6 is a perspective view of fibers in a fiber bench mounted to a substrate in alignment with other components on the substrate, in accordance with the present invention.

FIG. 6 is a perspective view of a fiber bench mounted to a substrate in alignment with other components on the substrate. The fiber bench 32 includes a plurality of fiber pigtails 48, mounted and aligned in accordance with the techniques described above, such that the. fiber cores at the fiber end faces 30A have minimal height offset and angular offset. An alignment face 33 of the fiber bench 32 is, in turn, in contact with a registration surface of a registration feature 58 of the substrate 55. The registration feature 58 serves as a known position on the substrate 55, at a known distance and angular orientation with respect to other registration features, for example feature 56. Additional system components, such as components 54 and 52, are likewise mounted to the substrate, aligned by respective registration features 56 and 58. Assuming that the individual fiber optic cores in the fiber optics 30 are at a known position with respect to the alignment face 33, then it follows that the individual fiber optics can be aligned with the other components 52, 54 on the substrate 55 as a group, in a single step, by registering the alignment face 33 of the array 32.

Figure 7:
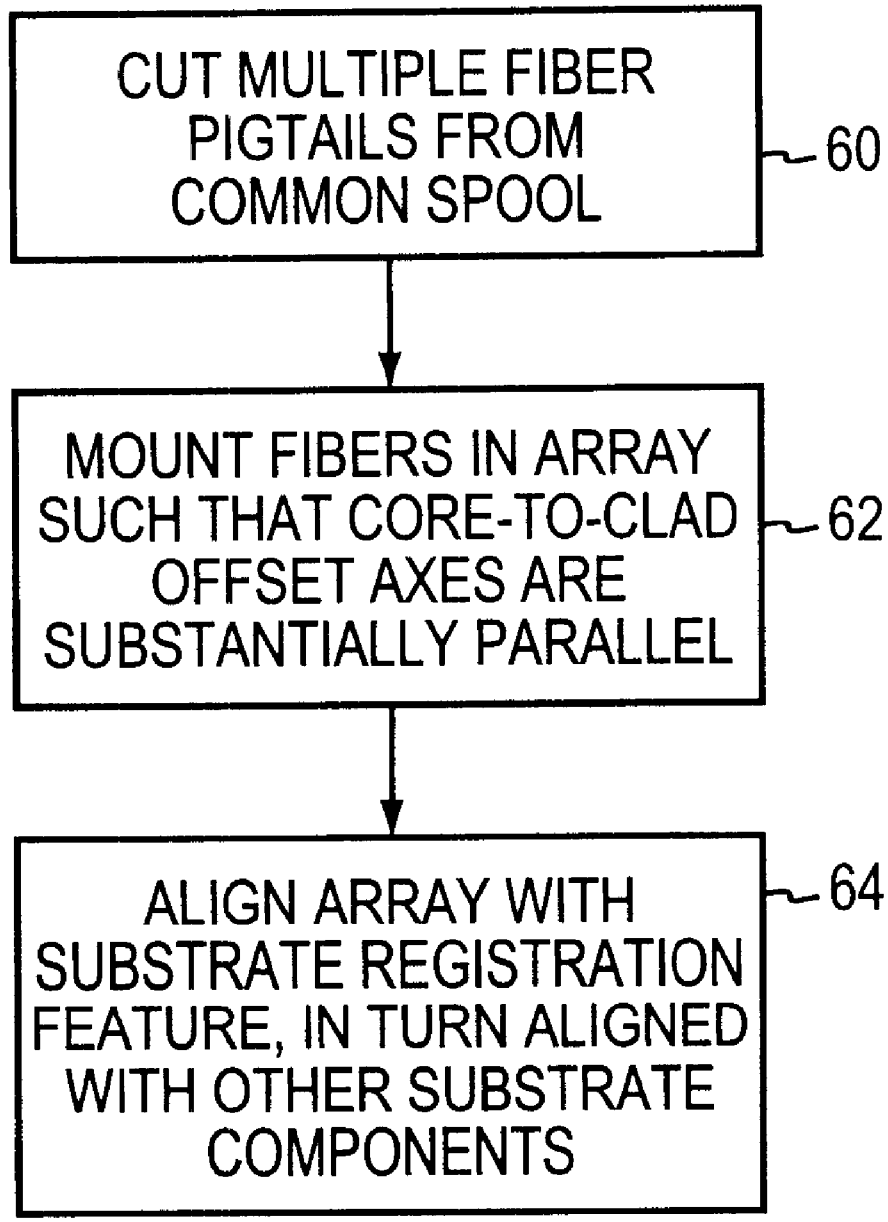
FIG. 7 is a flow diagram of a manufacturing process for mounting the bench in alignment with other components on the substrate, in accordance with the present invention.

FIG. 7 is a flow diagram of a manufacturing process for mounting the bench in alignment with other components on the substrate. In step 60, the multiple fiber pigtails are cut from a common spool, as described above. According to step 62, the pigtails are then mounted in the fiber array such that the core-to-clad offset axes are substantially parallel, as described above. Following this, in step 64, the fiber array is aligned with a registration feature on the substrate, the registration feature in turn being at a known position and orientation with respect to other substrate components. In this manner, the fibers in the array are brought into alignment with system components as a collective group, and therefore, alignment with respect to each individual fiber is not necessary.

While this invention has been particularly shown and described with references to preferred embodiments thereof, it will be understood by those skilled in the art that various changes in form and details may be made herein without departing from the spirit and scope of the invention as defined by the appended claims.

We claim:

1. A fiber array comprising:
a bench including seats for receiving fibers; and
fibers mounted in the seats, the fibers comprising a fiber core and cladding surrounding the fiber core, each fiber having a core-to-clad offset axis defined between the fiber core center and the cladding center of each fiber, the fibers being mounted in the array such that the respective core-to-clad offset axes of the fibers are substantially parallel to each other.

2. The fiber array of claim 1 wherein the seats comprise V-grooves.

3. The fiber array of claim 1 wherein the bench comprises silicon.

4. The fiber array of claim 1 wherein the bench includes an upper portion and a lower portion, and wherein the upper and lower portions each include opposed seats for housing inserted fibers.

5. The fiber array of claim 1 wherein the bench includes an upper portion and a lower portion, and wherein the lower portion includes the seats and wherein the upper portion comprises a plate.

6. The fiber array of claim 1 wherein the plurality of fibers are cut from a common fiber spool.

7. The fiber array of claim 6 wherein the fiber spool has a registration feature extending along its length; and the fibers are mounted in the bench with registration features aligned with respect to each other.

8. A fiber array comprising:
a bench including seats for receiving fibers; and
a plurality of fibers mounted in the seats, the fibers comprising a fiber core and cladding surrounding the fiber core, the fibers being cut from a common fiber spool; wherein each fiber has a core-to-clad offset axis defined between the fiber core center and the cladding center of each fiber, the fibers being mounted in the array such that the respective core-to-clad offset axes of the fibers are substantially parallel to each other.

9. The fiber array of claim 8 wherein the seats comprise V-grooves.

10. The fiber array of claim 8 wherein the bench comprises silicon.

11. The fiber array of claim 8 wherein the bench includes an upper portion and a lower portion, and wherein the upper and lower portions each include opposed seats for housing inserted fibers.

12. The fiber array of claim 8 wherein the bench includes an upper portion and a lower portion, and wherein the lower portion includes the seats and wherein the upper portion comprises a plate.

13. The fiber array of claim 8 wherein the fiber spool has a registration feature extending along its length; and the fibers are mounted in the bench with registration features aligned with respect to each other.

14. A method of forming a fiber array comprising:
providing a bench including a plurality of parallel seats for receiving a plurality of fibers; and
mounting a plurality of fibers in the seats, the fibers comprising a fiber core and cladding surrounding the fiber core, each fiber having a core-to-clad offset axis defined between the fiber core center and the cladding center of each fiber, the fibers being mounted in the array such that the respective core-to-clad offset axes of the fibers are substantially parallel to each other.

15. The method of claim 14 further comprising providing seats in the form of V-grooves.

16. The method of claim 14 further comprising forming the bench of silicon.

17. The method of claim 14 further comprising forming the bench to include an upper portion and a lower portion, and wherein the upper and lower portions each include opposed seats for housing inserted fibers.

18. The method of claim 14 further comprising forming the bench to include an upper portion and a lower portion, and wherein the lower portion includes the seats and wherein the upper portion comprises a plate.

19. The method of claim 14 further comprising cutting the plurality of fibers from a common fiber spool.

20. The method of claim 19 wherein the fiber spool has a registration feature extending along its length; and the fibers are mounted in the bench with registration features aligned with respect to each other.

21. The method of claim 14 further comprising mounting the bench to a substrate in alignment with a component mounted to the substrate, such that the fiber cores are aligned with the component.

22. A method of forming a fiber array comprising:
providing a bench including a plurality of parallel seats for receiving a plurality of fibers; and
mounting a plurality of fibers in the seats, the fibers comprising a fiber core and cladding surrounding the fiber core, the fibers being cut from a common fiber spool; wherein each fiber has a core-to-clad offset axis defined between the fiber core center and the cladding center of each fiber, the fibers being mounted in the array such that the respective core-to-clad offset axes of the fibers are substantially parallel to each other.

23. The method of claim 22 further comprising providing seats in the form of V-grooves.

24. The method of claim 22 further comprising forming the bench of silicon.

25. The method of claim 22 further comprising forming the bench to include an upper portion and a lower portion, and wherein the upper and lower portions each include opposed seats for housing inserted fibers.

26. The method of claim 22 further comprising forming the bench to include an upper portion and a lower portion, and wherein the lower portion includes the seats and wherein the upper portion comprises a plate.

27. The method of claim 26 wherein the fiber spool has a registration feature extending along its length; and the fibers are mounted in the bench with registration features aligned with respect to each other.

28. The method of claim 22 further comprising mounting the bench to a substrate in alignment with a component mounted to the substrate, such that the fiber cores are aligned with the component.

* * * * *